United States Patent
Furusho et al.

(10) Patent No.: US 8,862,907 B2
(45) Date of Patent: Oct. 14, 2014

(54) INFORMATION PROCESSING APPARATUS AND POWER SUPPLY CONTROL METHOD

(75) Inventors: Takeshi Furusho, Tokyo (JP); Daiki Yanagidaira, Tokyo (JP); Shojiro Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 13/097,273

(22) Filed: Apr. 29, 2011

(65) Prior Publication Data

US 2011/0307732 A1  Dec. 15, 2011

(30) Foreign Application Priority Data

Jun. 9, 2010 (JP) ................................. 2010-132323

(51) Int. Cl.
  *G06F 1/00* (2006.01)
  *G06F 1/26* (2006.01)
  *H02J 7/00* (2006.01)
(52) U.S. Cl.
  CPC ............... *H02J 7/0068* (2013.01); *G06F 1/263* (2013.01)
  USPC ............................ 713/300; 713/320; 713/340
(58) Field of Classification Search
  None
  See application file for complete search history.

(56) References Cited

U.S. PATENT DOCUMENTS

| | | | | |
|---|---|---|---|---|
| 6,011,323 A | * | 1/2000 | Camp | 307/64 |
| 2003/0159073 A1 | * | 8/2003 | Breen et al. | 713/300 |
| 2009/0160500 A1 | * | 6/2009 | Niculae et al. | 327/109 |

FOREIGN PATENT DOCUMENTS

JP  8-264207  10/1996

* cited by examiner

*Primary Examiner* — Kim Huynh
*Assistant Examiner* — Vincent Chang
(74) *Attorney, Agent, or Firm* — Oblon, Spivak, McClelland, Maier & Neustadt, L.L.P.

(57) ABSTRACT

There is provided an apparatus including an information processing apparatus including an internal system which consumes electric power, an AC adaptor identification unit which identifies a rating of an AC adaptor connected, and a battery charge control unit which controls charge of a battery storing electric power, the electric power being used for operation of the internal system, where the AC adaptor identification unit identifies a rating of the AC adaptor connected and switches a power supply path to the battery charge control unit and/or the internal system into a proper state according to the identification results.

10 Claims, 6 Drawing Sheets

INFORMATION PROCESSING APPARATUS AND POWER SUPPLY CONTROL METHOD

BACKGROUND OF THE INVENTION

1. Field of the Invention

The present invention relates to an information processing apparatus and a power supply control method.

2. Description of the Related Art

A notebook personal computer operates or charges a built-in battery, by receiving power supply from an AC adaptor which transforms voltage of commercial power into predetermined direct-current voltage suitable for the personal computer (see JP H8-264207A, for example).

A notebook personal computer in the related art needs to be supplied, from an AC adaptor, with electric power equal to or greater than maximum power consumption of the personal computer. Accordingly, when a personal computer has high throughout capacity, its maximum power consumption increases correspondingly, and an AC adaptor of a high rating is needed.

SUMMARY OF THE INVENTION

In recent years, a notebook personal computer has also become smaller/lighter while been provided with enhanced performance. However, as described above, as a rating of an AC adaptor became higher, its size became larger and its weight became heavier, and there was an issue that it was not easy to make the AC adaptor smaller.

Further, in case of a business trip, outgo, a long meeting, or the like, it is difficult to drive a notebook personal computer only by a battery for a long time, and, in such a case, an AC adaptor accordingly needs to be also carried. Therefore, not only the personal computer itself but also a large, heavy AC adaptor had to be carried, thereby putting a user under stress.

In light of the foregoing, it is desirable to provide an information processing apparatus and a power supply control method, which are novel and improved, and which are capable of not only realizing power supply from an AC adapter of a low rating but also switching an internal power path according to difference in ratings of AC adaptors.

According to an embodiment of the present invention, there is provided an information processing apparatus including an internal system which consumes electric power, an AC adaptor identification unit which identifies a rating of an AC adaptor connected, and a battery charge control unit which controls charge of a battery storing electric power, the electric power being used for operation of the internal system, where the AC adaptor identification unit identifies a rating of the AC adaptor connected and switches a power supply path to the battery charge control unit and/or the internal system into a proper state according to the identification results.

When a rating of the AC adaptor connected is equal to or higher than a predetermined threshold, the AC adaptor identification unit may use electric power supplied from the AC adaptor as operating power of the internal system and may supply the battery charge control unit with excess of the operating power so as to charge the battery with the same. When a rating of the AC adaptor connected is lower than a predetermined threshold, the AC adaptor identification unit may supply the battery charge control unit with the whole electric power supplied from the AC adaptor and may use electric power supplied from the AC adaptor and/or electric power supplied from the battery as operating power of the internal system.

The information processing apparatus may further include a battery charger which receives power supply from the AC adaptor and supplies the battery with electric power according to control by the battery charge control unit.

When operating power of the internal system is greater than output power of the battery charger, the whole output power of the battery charger may be used as operating power of the internal system and shortage of electric power output from the battery charger may be covered with electric power from the battery.

When operating power of the internal system is smaller than output power of the battery charger, part of output power of the battery charger may be used as operating power of the internal system and excess of electric power output from the battery charger may be supplied to the battery.

When operating power of the internal system is very low, most of output of the battery charger may be supplied to the battery.

According to another embodiment of the present invention, there is provided a power supply control method, including the steps of identifying a rating of an AC adaptor connected to an information processing apparatus including an internal system which consumes electric power and a battery charge control unit which controls charge of a battery storing electric power, the electric power being used for operation of the internal system, and controlling charge of the battery by the battery charge control unit, where, in the step of identifying, a rating of the AC adaptor connected to the information processing apparatus is identified, and a power supply path to the battery charge control unit and/or the internal system is switched into a proper state according to the identification results.

According to the embodiments of the present invention described above, it is possible to provide an information processing apparatus and a power supply control method, which are novel and improved, and which are capable of not only realizing power supply from an AC adapter of a low rating but also switching an internal power path according to difference in ratings of AC adaptors.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
<1. An embodiment of the present invention>
[1-1. Outer view example of information processing apparatus]
[1-2. Configuration example of information processing apparatus in related art]
[1-3. Configuration of information processing apparatus according to present embodiment]
[1-4. Operation of information processing apparatus according to present embodiment]<2. Summary>

1. An Embodiment of the Present Invention

[1-1. Outer View Example of Information Processing Apparatus]

Figure 1:
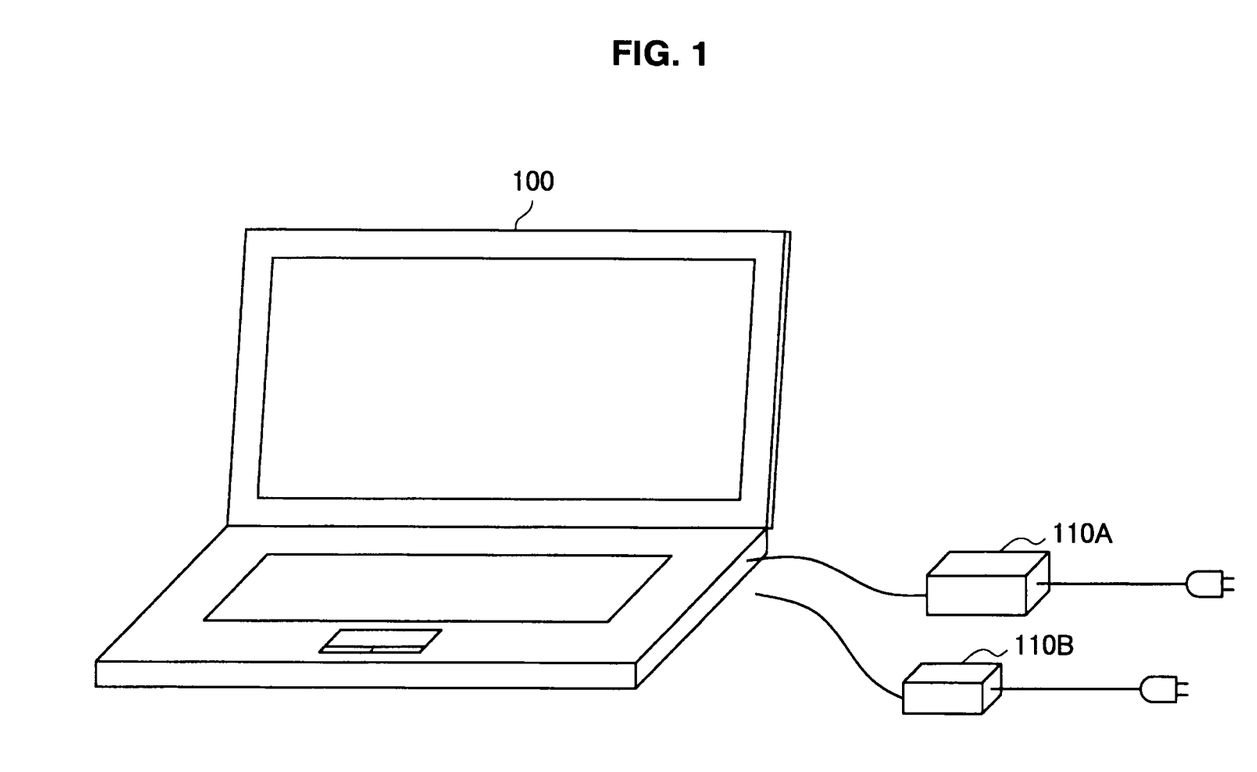
FIG. 1 is an explanatory diagram illustrating an outer view of an information processing apparatus 100 according to an embodiment of the present invention.

First, an outer view example of an information processing apparatus according to an embodiment of the present invention will be explained. FIG. 1 is an explanatory diagram illustrating an outer view of an information processing apparatus 100 according to an embodiment of the present invention. Hereafter, the outer view example of the information processing apparatus 100 according to an embodiment of the present invention will be explained using FIG. 1.

As shown in FIG. 1, the information processing apparatus 100 according to an embodiment of the present invention is a notebook personal computer, and operates by receiving supply of predetermined electric power from an AC adaptor 110A connected to a commercial power source. And when the AC adaptor 110A is not connected to the information processing apparatus 100, the information processing apparatus 100 operates by receiving power supply from a battery (not shown) provided therein.

There is usually one type of AC adaptor connectable to the information processing apparatus 100. This is because the information processing apparatus 100 needs to be supplied, from an AC adaptor, with electric power equal to or greater than its maximum power consumption, as described above.

Accordingly, in the present embodiment, it is made possible to connect multiple types of AC adaptors to the information processing apparatus 100, and the information processing apparatus 100 changes operation of its internal components, by identifying the AC adaptor connected thereto. For example, in the present embodiment, it is made possible to connect both the AC adaptor 110A, which supplies electric power equal to and greater than maximum power consumption of the information processing apparatus 100, and an AC adaptor 110B, which supplies electric power smaller than maximum power consumption of the information processing apparatus 100, to the information processing apparatus 100.

Namely, when the AC adaptor 110A which can supply electric power equal to or greater than maximum power consumption of the information processing apparatus 100 (such an AC adaptor will be conveniently referred to also as "a large AC adaptor" hereafter) is connected to the information processing apparatus 100, electric power from the large AC adaptor is used as electric power necessary for operation of internal components (system power consumption) and is used for charge of a battery, as in a notebook personal computer in the related art. On the other hand, the AC adaptor 110B which can supply electric power smaller than maximum power consumption of the information processing apparatus 100 (such an AC adaptor will be conveniently referred to also as "a small AC adaptor" hereafter) is connected to the information processing apparatus 100, electric power from the small AC adaptor is used for operation of the system. However, when the system cannot operate only by electric power from the small AC adaptor, electric power from the battery is also used for operation of the system. When the system can operate only by electric power from the small AC adaptor and excess electric power is output from the small AC adaptor, the electric power from the small AC adaptor is also used for charge of the battery.

In this manner, in the information processing apparatus 100 according to an embodiment of the present invention, it is made possible to connect multiple types of AC adaptors to the information processing apparatus 100, by identifying the AC adaptor connected to the information processing apparatus 100 and changing operation of internal components according to the type of the AC adaptor connected to the information processing apparatus 100. Further, since it is made possible to connect not only a large AC adaptor but also a small AC adaptor to the information processing apparatus 100, when a user carries the information processing apparatus 100 together with an AC adaptor due to a business trip, outgo, a long meeting, or the like, stress of the user in carrying them can be alleviated when a small AC adaptor is selected.

In the above, the outer view example of the information processing apparatus 100 according to an embodiment of the present invention has been explained using FIG. 1. Next, a configuration of the information processing apparatus 100 according to an embodiment of the present invention will be explained. However, for comparative explanation, a configuration example of an information processing apparatus in the relate art will be first explained with reference to a drawing.

[1-2. Configuration Example of Information Processing Apparatus in Related Art]

Figure 7:
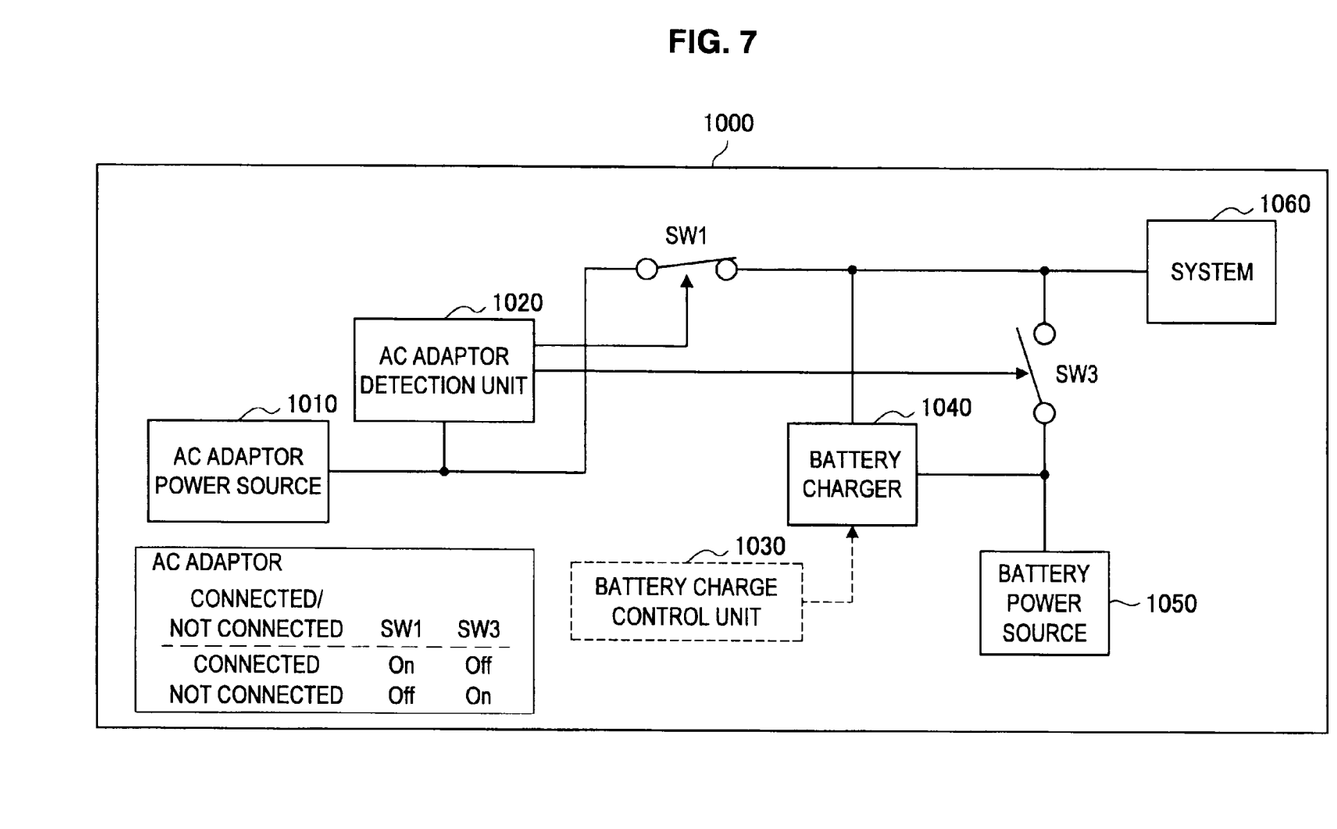
FIG. 7 is an explanatory diagram illustrating a configuration example of an information processing apparatus 1000 which is a notebook personal computer in the related art.

FIG. 7 is an explanatory diagram illustrating a configuration example of an information processing apparatus 1000, which is a notebook personal computer in the related art. Hereafter, the configuration example of the information processing apparatus 1000 in the related art will be explained using FIG. 7.

For example, the information processing apparatus in the related art 1000 includes an AC adaptor power source 1010, an AC adaptor detection unit 1020, a battery charge control unit 1030, a battery charger 1040, a battery power source 1050, a system 1060, and switches SW1, SW3.

The AC adaptor power source 1010 is an AC adaptor connected to the information processing apparatus 1000, and transforms commercial power (not shown) into predetermined direct-current voltage suitable for the internal system 1060. The AC adaptor power source 1010 can output 19.5V/ 90 W, for example, and supply the same to internal components of the information processing apparatus 1000.

The AC adaptor detection unit 1020 detects, by a given method, whether or not the AC adaptor power source 1010 is connected to the information processing apparatus 1000. When the AC adaptor detection unit 1020 has detected that the AC adaptor power source 1010 is connected to the information processing apparatus 1000, the AC adaptor detection unit 1020 performs switch control in that the switch SW1 is caused to be turned on and the switch SW3 is caused to be turned off. On the other hand, when the AC adaptor detection unit 1020 has detected that the AC adaptor power source 1010 is no longer connected to the information processing apparatus 1000, the AC adaptor detection unit 1020 performs switch control in that the switch SW1 is caused to be turned off and the switch SW3 is caused to be turned on.

By the AC adaptor detection unit 1020 detecting that the AC adaptor power source 1010 is connected to the information processing apparatus 1000 and causing the switch SW1 to be turned on and the switch SW3 to be turned off, electric power supplied from the AC adaptor power source 1010 is supplied to the system 1060 so as to be used for operation thereof. Further, the electric power supplied from the AC adaptor power source 1010 is supplied, under control by the battery charge control unit 1030, via the battery charger 1040 to the battery power source 1050. Accordingly, when the AC adaptor power source 1010 is connected to the information processing apparatus 1000, the battery power source 1050 only gets charged and does not get discharged, and the information processing apparatus 1000 gets into a state where the information processing apparatus 1000 operates only by electric power from the AC adaptor power source 1010.

On the other hand, by the AC adaptor detection unit 1020 detecting that the AC adaptor power source 1010 is no longer connected to the information processing apparatus 1000 and causing the switch SW1 to be turned off and the switch SW3 to be turned on, electric power supplied from the battery power source 1050 is supplied to the system 1060 and so as to be used for operation thereof. Accordingly, when the AC adaptor power source 1010 is not connected to the information processing apparatus 1000, the battery power source 1050 only gets discharged and does not get charged, and the information processing apparatus 1000 gets into a state where the information processing apparatus 1000 operates only by electric power from the battery power source 1050.

The battery charge control unit 1030 controls charge of the battery power source 1050 by the battery charger 1040, as described above. The battery charge control unit 1030 controls power supply to the battery power source 1050 such that the battery power source 1050 is not overcharged, by detecting the voltage of the battery power source 1050.

When the AC adaptor power source 1010 is connected to the information processing apparatus 1000, the battery charger 1040 charges the battery power source 1050, by supplying electric power supplied from the AC adaptor power source 1010, under control by the battery charge control unit 1030, to the battery power source 1050.

The battery power source 1050 includes a secondary battery, such as a lithium battery, and supplies electric power for operation of the system 1060. Further, when the AC adaptor power source 1010 is connected to the information processing apparatus 1000, the battery power source 1050 gets charged by receiving from the battery charger 1040 supply of electric power supplied from the AC adapter power source 1010, under control by the battery charge control unit 1030.

The system 1060 is a block provided within the information processing apparatus 1000 which is a notebook personal computer, the block including a CPU, a ROM, a RAM, a recording medium such as a HDD, a SSD, and others, a display device such as a LCD and others, and the like. When electric power is supplied to the system 1060 and the system 1060 operates by the electric power, the information processing apparatus 1000 functions as a personal computer.

Further, as described above, the AC adaptor power source 1010 in the related art is configured to be able to supply to the information processing apparatus 1000 with electric power greater than maximum system power consumption of the system 1060. As an inevitable consequence, the size of the AC adaptor power source 1010 is large and the weight of the AC adaptor power source 1010 is heavy.

When a user carried an AC adaptor together with the information processing apparatus 1000, the user, however, had to carry the heavy AC adaptor, which put stress on the user. However, when the AD adaptor is merely made smaller, there is risk that the information processing apparatus cannot appropriately operate, because electric power from the AC adaptor power source is sometime insufficient as operating power of the system 1060.

Accordingly, in an embodiment of the present invention, it is made possible to connect multiple types of AD adaptors to the information processing apparatus, by identifying the connected AD adaptor and switching between internal power supply systems in accordance with the corresponding identification results. Moreover, an information processing apparatus 100, to which not only a large AC adaptor but also a small AC adaptor can be connected, will be shown. Accordingly, when a user carries an AC adaptor together with the information processing apparatus 100 due to a business trip, outgo, a long meeting, or the like, stress of the user in carrying them can be alleviated when a small AC adaptor is selected.

[1-3. Configuration of Information Processing Apparatus According to Present Embodiment]

Figure 2:
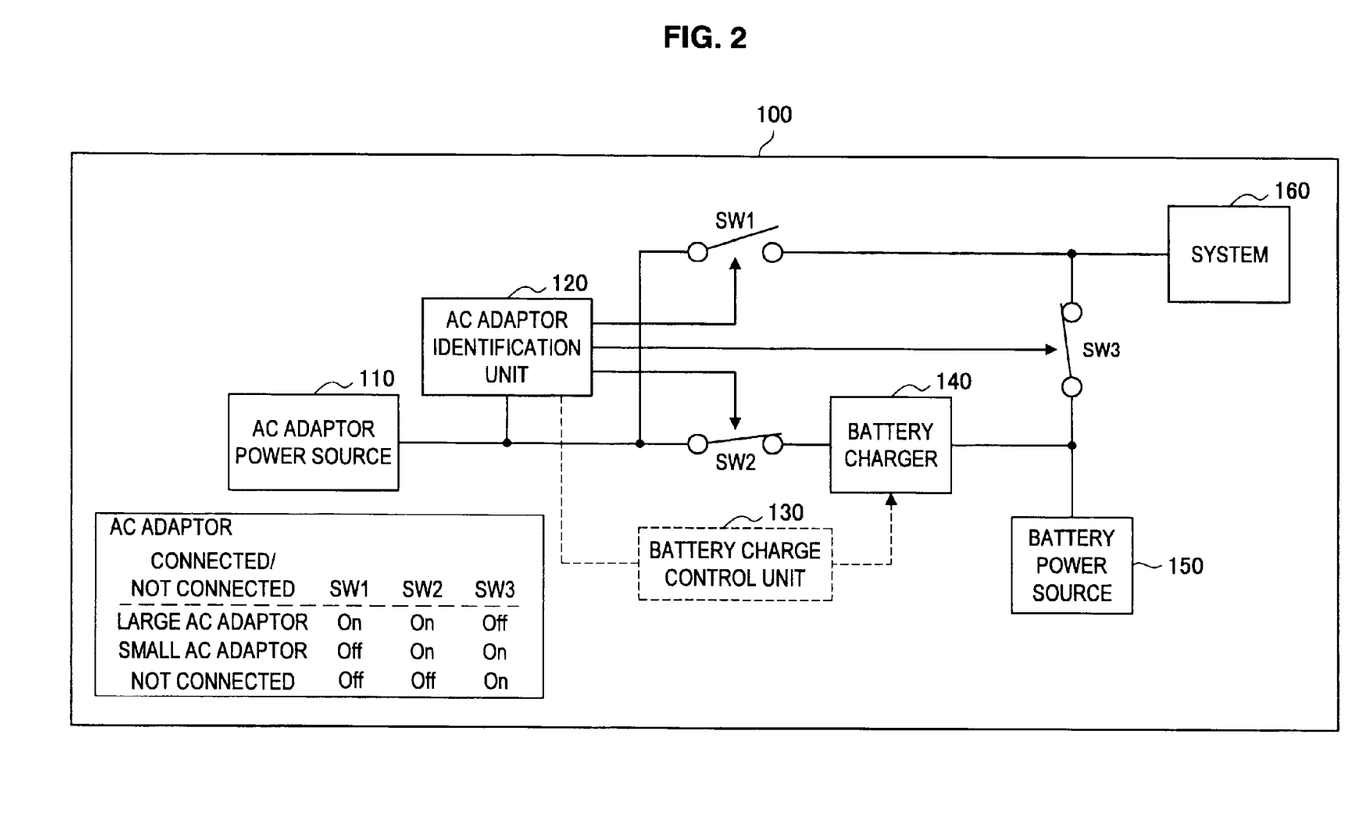
FIG. 2 is an explanatory diagram illustrating a configuration of an information processing apparatus 100 according to an embodiment of the present invention.

A configuration of an information processing apparatus 100 according to an embodiment of the present invention will be explained. FIG. 2 is an explanatory diagram illustrating a configuration of the information processing apparatus 100 according to an embodiment of the present invention. Hereafter, the configuration of the information processing apparatus 100 according to an embodiment of the present invention will be explained using FIG. 2.

As shown in FIG. 2, the information processing apparatus 100 includes an AC adaptor power source 110, an AC adaptor identification unit 120, a battery charge control unit 130, a battery charger 140, a battery power source 150, a system 160, and switches SW1, SW2, and SW3.

The AC adaptor power source 110 is an AC adaptor connected to the information processing apparatus 100, and transforms commercial power (not shown) into predetermined direct-current voltage suitable for the internal system 160. Here, the AC adaptor power source 110A or 110B shown in FIG. 1 is collectively referred to as an AC adaptor power source 110.

If the corresponding AC adaptor power source 110 is a large AC adaptor, the AC adaptor power source 110 can output 19.5V/90 W, which is obtained by transforming commercial power, for example, and supply the same to internal components of the information processing apparatus 100. Further, if the corresponding AC adaptor power source 110 is a small AC adaptor, the AC adaptor power source 110 can output 16.0V/40 W, which is obtained by transforming commercial power, for example, and can supply the same to internal components of the information processing apparatus 100.

The AC adaptor identification unit 120 detects, by a given method, whether or not the AC adaptor power source 110 is connected to the information processing apparatus 100. And when the AC adaptor power source 110 is connected to the information processing apparatus 100, the AC adaptor identification unit 120 identifies a rating of the connected AC adaptor power source 110, by a predetermined method.

Determination on whether or not the AC adaptor power source 110 is connected to the information processing apparatus 100 may be also made, for example, by physically detecting whether or not a connector of the AC adaptor power source 110 has been connected to the information processing apparatus 100 and by detecting whether or not current from the AC adaptor power source 110 flows via a predetermined lead wire within the information processing apparatus 100.

Further, in identifying a rating of the AC adaptor power source 110 connected to the information processing apparatus 100, the AC adaptor identification unit 120 may detect the output voltage of the AC adaptor power source 110, for example. Furthermore, the AC adaptor identification unit 120 may detect the rating of the AC adaptor power source 110, according to whether or not voltage in excess of a predetermined threshold is output from the AC adaptor power source 110.

In the above example, for example, if it is a large AC adaptor, its output voltage is 19.5V; if it is a small AC adaptor, its output voltage is 16.0V. Accordingly, it is possible for the AC adaptor identification unit 120 to identify the rating of the AC adaptor power source 110, by setting a threshold to around 17V in advance and detecting the output voltage of the AC adaptor power source 110.

Further, the AC adaptor identification unit 120 performs switch control, which is on/off control of the switches SW1, SW2, and SW3, according to whether or not the AC adaptor power source 110 is connected to the information processing apparatus 100. And when the AC adaptor power source 110 is connected to the information processing apparatus 100, the AC adaptor identification unit 120 performs switch control, which is on/off control of the switches SW1, SW2, and SW3, according to identification results on the rating of the AC adaptor power source 110.

When the AC adaptor identification unit 120 has detected that the AC adaptor power source 110 is connected to the information processing apparatus 100 and that the corresponding AC adaptor power source 110 is a large AC adaptor, the AC adaptor identification unit 120 performs switch control in that the switches SW1, SW2 are caused to be turned on and the switch SW3 is caused to be turned off. Further, when the AC adaptor identification unit 120 has detected that the AC adaptor power source 110 is connected to the information processing apparatus 100 and that the corresponding AC adaptor power source 110 is a small AC adaptor, the AC adaptor identification unit 120 performs switch control in that the switches SW2, SW3 are caused to be turned on and the switch SW1 is caused to be turned off. On the other hand, when the AC adaptor identification unit 120 has detected that the AC adaptor power source 110 is no longer connected to the information processing apparatus 100, the AC adaptor identification unit 120 performs switch control in that the switches SW1, SW2 are caused to be turned off and the switch SW3 is caused to be turned on.

When the AC adaptor identification unit 120 has detected that the AC adaptor power source 110 is connected to the information processing apparatus 100 and has detected that the connected AC adaptor power source 110 is a large AC adaptor, by causing the switches SW1, SW2 to be turned on and the switch SW3 to be turned off, electric power supplied from the AC adaptor power source 110 is supplied to the system 160 so as to be used for operation thereof. Further, the electric power supplied from the AC adaptor power source 110 is supplied via the battery charger 140 to the battery power source 150, under control by the battery charge control unit 130. Accordingly, when the AC adaptor power source 110 is connected to the information processing apparatus 100, the battery power source 150 only gets charged and does not get discharged, and the information processing apparatus 100 gets into a state where the information processing apparatus 100 operates only by electric power from the AC adaptor power source 110.

Further, when the AC adaptor identification unit 120 has detected that the AC adaptor power source 110 is connected to the information processing apparatus 100 and that the connected AC adaptor power source 110 is a small AC adaptor, by causing the switches SW2, SW3 to be turned on and the switch SW1 to be turned off, the whole electric power supplied from the AC adaptor power source 110 is supplied via the battery charger 140 to the battery power source 150 or the system 160. And the battery power source 150 gets charged or discharged in accordance with power consumption of the system 160. Furthermore, when electric power supplied from the AC adaptor power source 110 alone does not come up to electric power to be consumed by the system 160, because the switch SW3 is on, electric power supplied from the battery power source 150 is also supplied to the system 160 so as to be used for operation thereof. Accordingly, when the AC adaptor power source 110 is connected to the information processing apparatus 100 and the corresponding AC adaptor power source 110 is a small AC adaptor, the information processing apparatus 100 operates by electric power from the AC adaptor power source 110. And when electric power supplied from the AC adaptor power source 110 alone is not enough to satisfy operating power demand of the system 160, the system 160 operates also by electric power from the battery power source 150, and the battery power source 150 gets discharged for operation of the system 160.

On the other hand, by the AC adaptor identification unit 120 detecting that the AC adaptor power source 110 is no longer connected to the information processing apparatus 100 and causing the switches SW1, SW2 to be turned off and the switch SW3 to be turned on, electric power supplied from the battery power source 150 is supplied to the system 160 so as to be used for operation thereof. Accordingly, when the AC adaptor power source 110 is not connected to the information processing apparatus 100, the battery power source 150 only gets discharged and does not get charged, and the information processing apparatus 100 gets into a state where the information processing apparatus 100 operates only by electric power from the battery power source 150.

In this manner, when the AC adaptor power source 110 is connected to the information processing apparatus 100 and switch control of the switches SW1, SW2, and SW3 is performed by the AC adaptor identification unit 120 based on the identification results on the rating of the connected AC adaptor power source 110, appropriate power supply to internal components of the information processing apparatus 100 is performed according to the type of the AC adaptor connected to the information processing apparatus 100.

The battery charge control unit 130 controls charge of the battery power source 150 by the battery charger 140, as described above. The battery charge control unit 130 controls power supply to the battery power source 150 such that the battery power source 150 does not get overcharged, by detecting the voltage of the battery power source 150.

When the AC adaptor power source 110 is connected to the information processing apparatus 100, the battery charger 140 charges the battery power source 150, by supplying electric power supplied from the AC adaptor power source 110, under control by the battery charge control unit 130, to the battery power source 150.

The battery power source 150 includes a secondary battery, such as a lithium battery, and supplies electric power for operation of the system 160. Further, when the AC adaptor power source 110 is connected to the information processing apparatus 100, the battery power source 150 gets charged by receiving from the battery charger 140 supply of electric power supplied from the AC adapter power source 110, under control by the battery charge control unit 130.

The system 160 is a block provided within the information processing apparatus 100 which is a notebook personal computer, the block including a CPU, a ROM, a RAM, a recording medium such as a HDD, a SSD, and others, a display device such as a LCD and others, and the like. When electric power is supplied to the system 160 and the system 160 operates by the electric power, the information processing apparatus 100 functions as a personal computer.

In the above, the configuration of the information processing apparatus 100 according to an embodiment of the present invention has been explained using FIG. 2. Here, detailed explanation of power supply to the information processing apparatus 100 when the AC adaptor power source 110 is connected to the information processing apparatus 100 will be made using an explanatory diagram shown in FIG. 3.

Figure 3:
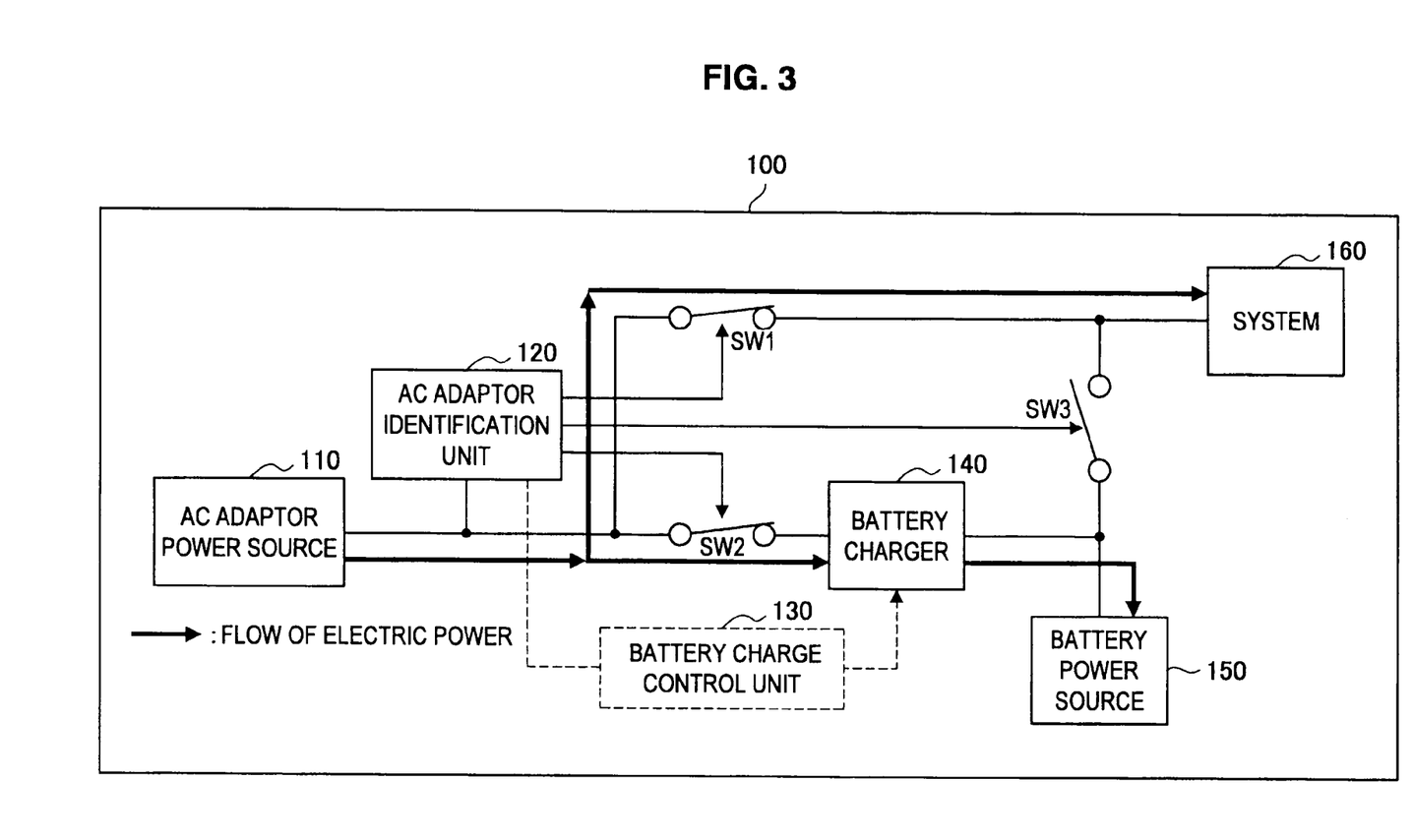
FIG. 3 is an explanatory diagram illustrating a flow of electric power in case where an AC adaptor power source 110 is connected to the information processing apparatus 100 and the AC adaptor power source 110 is a large AC adapter.

FIG. 3 is an explanatory diagram illustrating a flow of electric power in case where the AC adaptor power source 110 is connected to the information processing apparatus 100 and the corresponding AC adaptor power source 110 is a large AC adapter.

As described above, when the AC adaptor power source 110 is connected to the information processing apparatus 100 and the corresponding AC adaptor power source 110 is a large AC adapter, the AC adaptor identification unit 120 causes the switches SW1, SW2 to be turned on and the switch SW3 to be turned off. In this case, as shown in FIG. 3, electric power supplied from the AC adaptor power source 110 is supplied to the system 160 so as to be used for operation thereof. Further, electric power supplied from the AC adaptor power source 110 is supplied via the battery charger 140 to the battery power source 150 under control by the battery charge control unit 130. Accordingly, when the AC adaptor power source 110 is connected to the information processing apparatus 100, the battery power source 150 only gets charged and does not get discharged, and the information processing apparatus 100 gets into a state where the information processing apparatus 100 operates only by the electric power from the AC adaptor power source 110.

Figure 4:
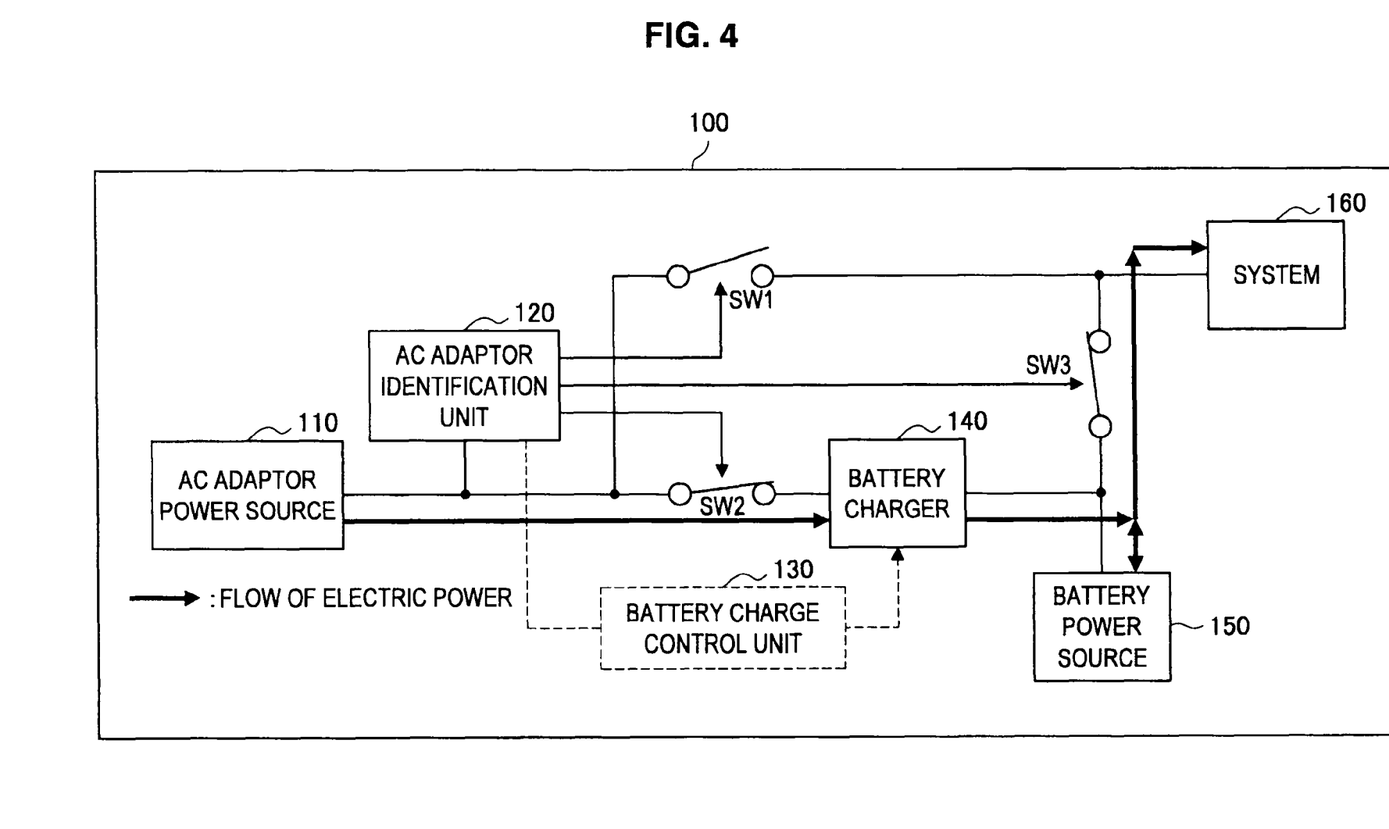
FIG. 4 is an explanatory diagram illustrating a flow of electric power in case where the AC adaptor power source 110 is connected to the information processing apparatus 100 and the AC adaptor power source 110 is a small AC adapter.

FIG. 4 is an explanatory diagram illustrating a flow of electric power in case where the AC adaptor power source 110 is connected to the information processing apparatus 100 and the corresponding AC adaptor power source 110 is a small AC adapter.

As described above, when the AC adaptor identification unit 120 has detected that the AC adaptor power source 110 is connected to the information processing apparatus 100 and that the connected AC adaptor power source 110 is a small AC adaptor, by causing the switches SW2, SW3 to be turned on and the switch SW1 to be turned off, the whole electric power supplied from the AC adaptor power source 110 is supplied to either the battery power source 150 or the system 160. And the battery power source 150 gets charged or discharged in accordance with power consumption of the system 160. Further, when electric power supplied from the AC adaptor power source 110 alone does not come up to electric power to be consumed by the system 160, because the switch SW3 is on, electric power supplied from the battery power source 150 is also supplied to the system 160 so as to be used for operation thereof. Accordingly, when the AC adaptor power source 110 is connected to the information processing apparatus 100 and the corresponding AC adaptor power source 110 is a small AC adaptor, the information processing apparatus 100 operates by electric power the AC adaptor power source 110. And when electric power supplied from the AC adaptor power source 110 alone is not enough to satisfy operating power demand of the system 160, the system 160 operates also by electric power from the battery power source 150, and the battery power source 150 gets discharged for operation of the system 160.

Besides, when very little electric power is consumed by the system 160, such as when the information processing apparatus 100 is in a mode such as a stand-by state and a sleep state, most of output of the battery charger 140 may be supplied to the battery power source 150. Further, the AC adaptor detection unit 120 may have a function of monitoring power consumption of the system 160.

Figure 5:
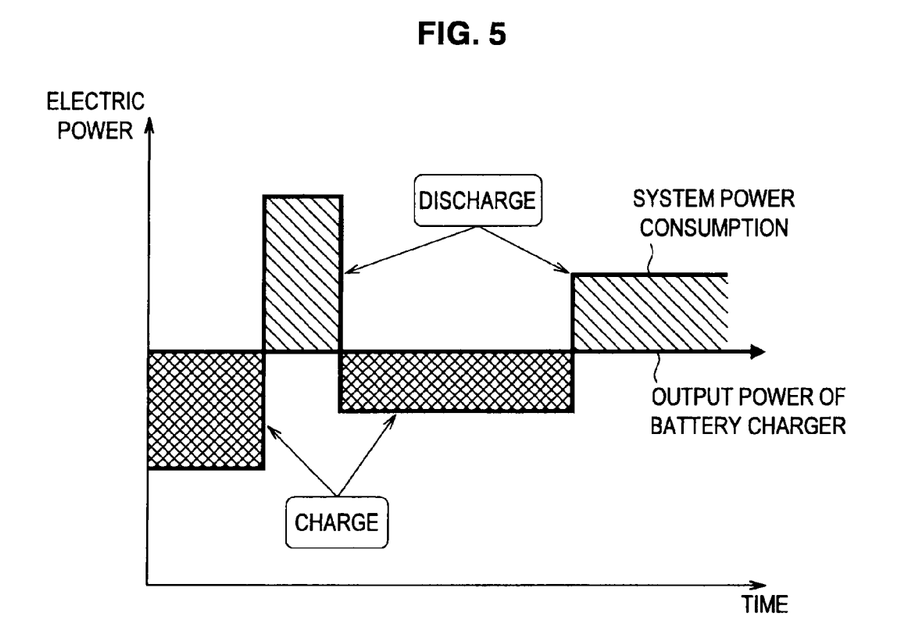
FIG. 5 is an explanatory diagram indicating by a graph an example of a relationship between electric power which is output by a battery charger 140 so as to be supplied to a battery power source 150 and electric power to be consumed by a system 160.

FIG. 5 is an explanatory diagram indicating by a graph an example of a relationship between electric power which is output by a battery charger 140 so as to be supplied to a battery power source 150 and electric power to be consumed by the system 160.

When electric power output by the battery charger 140 is greater than electric power to be consumed by the system 160, part of electric power output from the battery charger 140 is supplied as electric power to be consumed by the system 160, and excess of electric power output by the battery charger 140 (electric power output by the battery charger 140–electric power to be consumed by the system 160) is supplied to the battery power source 150, and the battery power source 150 is charged with the same. Further, when very little electric power is used, such as when the information processing apparatus 100 is shut down and when the information processing apparatus 100 is in a stand-by state, most of output of the battery charger 140 is used for charge of the battery power source 150.

On the other hand, when electric power output by the battery charger 140 is smaller than electric power to be consumed by the system 160, the whole electric power output by the battery charger 140 is used as electric power to be consumed by the system 160, and shortage of electric power which is used as electric power to be consumed by the system 160 (electric power to be consumed by the system 160–electric power output by the battery charger 140) is supplied from the battery power source 150, so that the shortage of electric power is covered by the battery power source 150.

In this manner, between the above two states is automatically switched according to balance between electric power to be consumed by the system 160 and electric power output by the battery charger 140, without the states being specially controlled.

Besides, electric power is not constantly output by the battery charger 140 all the time, and electric power output by the battery charge 140 varies according to remaining capacity of the battery power source 150, or the like. Namely, when the battery power source 150 including a lithium battery, and the like, is used, a scheme is generally employed in that the electric power output by the battery charger 140 varies below predetermined maximum charging voltage and predetermined maximum charging current, according to charging condition (charging voltage) of the battery power source 150 (electric power output by the battery charger 140 is determined according to the charging condition of the battery power source 150). Accordingly, electric power determined according to the charging condition of the battery power source 150 is supplied from the battery charger 140, and this output of the battery charger 140 is used as electric power to be consumed by the system 160. Further, electric power obtained by subtracting electric power to be consumed by the system 160 from output power of the battery charger 140 is used for charge of the battery power source 150, but, in case of power shortage, the corresponding power is discharged from the battery power source 150 to the system 160.

In the above, power supply to the information processing apparatus 100 when the AC adaptor power source 110 is connected to the information processing apparatus 100 has been explained. Next, operation of the information processing apparatus 100 according to an embodiment of the present invention will be explained.

[1-4. Operation of Information Processing Apparatus According to Present Embodiment]

Figure 6:
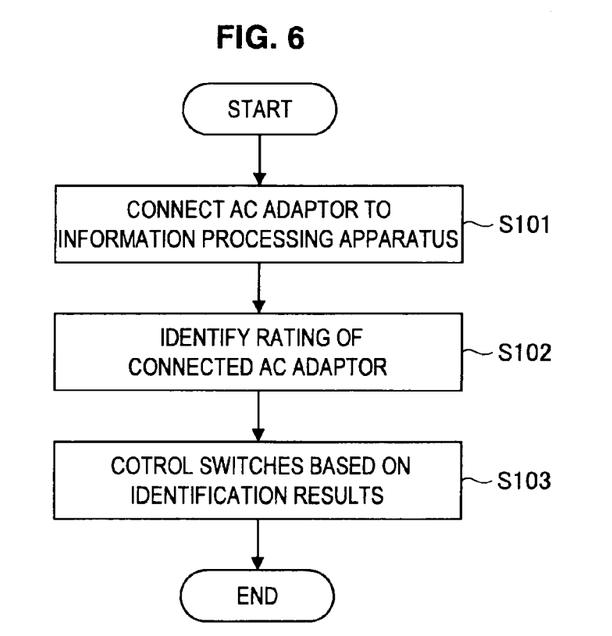
FIG. 6 is a flow diagram illustrating operation of the information processing apparatus 100 according to an embodiment of the present invention.

FIG. 6 is a flow diagram illustrating operation of the information processing apparatus 100 according to an embodiment of the present invention. The flow diagram in FIG. 6 shows operation of the information processing apparatus 100 when the AC adaptor power source 110 is connected to the information processing apparatus 100. Hereafter, the operation of the information processing apparatus 100 according to an embodiment of the prevent invention will be explained using FIG. 6.

When the AC adaptor power source 110 is connected to the information processing apparatus 100 by a user of the information processing apparatus 100 (step S101), the AC adaptor identification unit 120 identifies a rating of the AC adaptor power source 110 connected to the information processing apparatus 100 (step S102).

In the identification by the AC adaptor identification unit 120 of the rating of the AC adaptor power source 110 connected to the information processing apparatus 100, for example, the output voltage of the AC adaptor power source 110 may be detected, as described above. Further, the AC adaptor identification unit 120 may identify the rating of the AC adaptor power source 110 connected to the information processing apparatus 100, according to whether or not the voltage in excess of a predetermined threshold is output from the AC adaptor power source 110 connected to the information processing apparatus 100.

In the above example, for example, in case of a large AC adaptor, the output voltage is 19.5V; in case of a small AC adaptor, the output voltage is 16.0V. Accordingly, the AC adaptor identification unit 120 sets a threshold to around 17V in advance. Further, the AC adaptor identification unit 120 can identify the rating of the AC adaptor power source 110 connected to the information processing apparatus 100, by detecting the output voltage of the AC adaptor power source 110 connected to the information processing apparatus 100.

As a matter of course, in the present technology, the identification of the rating of the AC adaptor power source 110 by the AC adaptor identification unit 120 is not limited to this example. For example, the rating of the AC adaptor power source 110 may be physically identified according the shape, or the like, of the connector of the AC adaptor power source 110. Alternatively, the rating of the AC adaptor power source 110 connected to the information processing apparatus 100 may be identified, by predetermined information being superimposed on electric power supplied to the information processing apparatus 100 so as to be acquired by the AC adaptor identification unit 120.

After the AC adaptor identification unit 120 has identified the rating of the AC adaptor power source 110 connected to the information processing apparatus 100, the AC adaptor identification unit 120 performs on/off control of the switches SW1, SW2, and SW3, based on the identification results on the rating of the AC adaptor power source 110 (step S103).

More specifically, as described above, when the AC adaptor identification unit 120 has detected that the AC adaptor power source 110 is connected to the information processing apparatus 100 and that the AC adaptor power source 110 connected to the information processing apparatus 100 is a large AC adaptor, the AC adaptor identification unit 120 causes the switches SW1, SW2 to be turned on and the switch SW3 to be turned off. Alternatively, when the AC adaptor identification unit 120 has detected that the AC adaptor power source 110 is connected to the information processing apparatus 100 and that the AC adaptor power source 110 connected to the information processing apparatus 100 is a small AC adaptor, the AC adaptor identification unit 120 causes the switches SW2, SW3 to be turned on and the switch SW1 to be turned off.

In this manner, by performing on/off control of the switches SW1, SW2, and SW3 based on the identification results on the AC adaptor power source 110 connected to the information processing apparatus 100, it is possible to appropriately supply electric power supplied from the AC adaptor power source 110, to the system 160 and/or the battery power source 150, according to the power supply ability of the AC adaptor power source 110.

In the above, the operation of the information processing apparatus 100 according to an embodiment of the present invention has been explained using FIG. 6.

2. Summary

As described above, in the information processing apparatus 100 according to an embodiment of the present invention, the rating of the AC adaptor power source 110 is identified by the AC adaptor identification unit 120, and switching control is performed in that AC adaptor identification unit 120 performs on/off control of the switches SW1, SW2, and SW3 based on the identification results. By the AC adaptor identification unit 120 performing on/off control of the switches SW1, SW2, and SW3 based on the identification results, it is possible to appropriately supply electric power supplied from the AC adaptor power source 110, to the system 160 and/or the battery power source 150, according to the power supply ability of the AC adaptor power source 110.

When the configuration of the information processing apparatus 1000 in the related art shown in FIG. 7 is compared with the configuration of the information processing apparatus 100 according to an embodiment of the present invention shown in FIG. 2, the information processing apparatus 100 is created by performing minimal modification on the information processing apparatus 1000 in the related art, namely, addition of the switch SW2, change of a supply path to the battery charger 140, and change of the AC adaptor detection unit 1020 to the AC adaptor identification unit 120. Further, operation states which exist also in the information processing apparatus in the related art, namely, operation when the AC adaptor is connected thereto and operation by the battery, can be utilized also in the information processing apparatus 100, and it is possible to realize the information processing apparatus 100 according to an embodiment of the present invention, by performing minor modification on the information processing apparatus 1000 in the related art.

Further, when rated power of a small AC adaptor is below maximum charging power of the battery power source 150, it is possible to switch to setting most suitable for the information processing apparatus 100, by switching, via the battery charge control unit 130 shown in FIG. 2, for example, to setting of charging power of the battery power source 150 according to the rated power of the AC adaptor.

As merits to make an AC adaptor smaller, it makes possible to significantly reduce stress in carrying the AC adaptor in case of a business trip and a long meeting and to improve the design of the AC adaptor itself on the assumption that the AC adaptor is carried together with the information processing apparatus 100 itself. Further, when it is made possible to use both an AC adaptor in the related art (a large AC adaptor) and a small AC adaptor used in the information processing apparatus 100 according to an embodiment of the present invention, it becomes possible to use both as the situation demands. Namely, when it is desired to cause the information processing apparatus to perform high-load processing, or to constantly charge the battery power source 150, the AC adaptor of a high rating in the related art is used; when it is desired to cause the information processing apparatus to perform low-load processing, or to extend battery life of the battery power source 150, a small AC adaptor can be used.

According to an embodiment of the present invention, when the information processing apparatus 100 consumes electric power of 90 W at a maximum, it becomes possible to use a small AC adaptor of a low rating, which ranges between 30 W and 40 W, for example, and it becomes possible to make the AC adaptor itself smaller/lighter to a large extent, thereby becoming easy to carry the AC adaptor power source. Compared between the volume of an AC adaptor rated at 90 W and the volume of an AC adaptor rated at 64 W, the volume of the AC adaptor rated at 90 W is 182 cc (121.5×49.5×30.2 mm) while the volume of the AC adaptor rated at 64 W is 92 cc (100×36×25.5 mm). The volume of the AC adaptor rated at 64 W accounts for only about 50 percent of the volume of the AC adaptor rated at 90 W, and it is clear that it becomes possible to make the AC adaptor power source itself smaller/lighter to a large extent.

Besides, process of identifying the rating of the AC adaptor by the AC adaptor identification unit 120 and switching control of the switches SW1, SW2, and SW3 according to the identification results described above may be performed by hardware, or may be performed by software. When the identification process and the switching control as described above are performed by software, for example, a computer program programmed to perform the identification process and the switching control may be provided within the information processing apparatus 100, and the program may be read out by a controller, such as CPU and others, and may be orderly executed.

Besides, in the present specification, steps described in the flowcharts include not only processing performed chronologically in accordance with the described order, but also processing performed in a parallel or individual manner, even though it is not necessarily processed chronologically. It should be appreciated that the order of the steps processed chronologically may be also appropriately changed according to the situation.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-132323 filed in the Japan Patent Office on Jun. 9, 2010, the entire content of which is hereby incorporated by reference.

What is claimed is:

1. An information processing apparatus comprising:
an internal system which consumes electric power;
circuitry configured to identify an AC adaptor connected to the information processing apparatus as one of a first AC adaptor or a second AC adaptor, the first AC adaptor having a higher rating than the second AC adaptor; and
a battery charge control circuit configured to control charging of a battery storing electric power, the electric power being used for operation of the internal system;
a first switch to connect the AC adaptor to the internal system;
a second switch to connect the AC adaptor to the battery charger; and
a third switch to connect an output of the battery charger to the internal system, the output of the battery charger being connected to the battery,
wherein the circuitry controls the first, second and third switches to switch a power supply path to the battery charge control circuit and/or the internal system into a proper state according to whether the AC adaptor connected is the first AC adaptor or the second AC adaptor, and
when the AC adaptor connected is the second AC adaptor, the circuitry switches the power supply path to supply all electric power from the second AC adaptor to the battery charge control circuit, and the internal system is connected in parallel to the battery to be supplied with electric power from at least one of the battery and the second AC adaptor.

2. The information processing apparatus according to claim 1,
wherein, when the AC adaptor connected is the first AC adaptor, the circuitry switches the power supply path so that electric power supplied from the first AC adaptor is provided as operating power to the internal system and so that excess power not used as operating power by the internal system is provided to the battery charge control circuit to charge the battery with the same.

3. The information processing apparatus according to claim 1, further comprising:
a battery charger which receives power supply from the AC adaptor connected to the information processing apparatus and supplies the battery with electric power according to control by the battery charge control circuit.

4. The information processing apparatus according to claim 3, wherein, when operating power of the internal system is greater than output power of the battery charger, the circuitry switches the power supply path to supply a whole output power of the battery charger as operating power to the internal system and any shortage of electric power output from the battery charger is covered with electric power from the battery.

5. The information processing apparatus according to claim 3, wherein, when operating power of the internal system is smaller than output power of the battery charger, the circuitry switches the power supply path so that part of output power of the battery charger is supplied as operating power to the internal system and any excess of electric power output from the battery charger is supplied to the battery.

6. The information processing apparatus according to claim 3, wherein, when operating power of the internal system is below a predetermined minimum level, the circuitry switches the power supply path so that greater than fifty percent of the output of the battery charger is supplied to the battery.

7. A power supply control method, comprising:
identifying an AC adaptor connected to an information processing apparatus as one of a first AC adaptor and a second AC adaptor, a rating of the first AC adaptor being higher than a rating of the second AC adaptor, the information processing apparatus including an internal system which consumes electric power, a battery charge control circuit which controls charging of a battery storing electric power, a first switch to connect the AC adaptor to the internal system, a second switch to connect the AC adaptor to the battery charger, and a third switch to connect an output of the battery charger to the internal system, the electric power being used for operation of the internal system; and controlling charge of the battery by the battery charge control circuit, wherein, in the identifying, the first, second and third switches are controlled to switch a power supply path to the battery charge control circuit and/or the internal system according to whether the AC adaptor connected is the first AC adaptor or the second AC adaptor, and when the AC adaptor connected is the second AC adaptor, the power supply path is switched so that all electric power from the second AC adaptor is supplied to the battery charge control, and the internal system is connected in parallel to the battery to be supplied with electric power from at least one of the battery and the second AC adaptor.

8. The information processing apparatus according to claim 1, wherein when the rating of the AC adaptor is above the predetermined threshold, the circuitry closes the first and second switches and opens the third switch.

9. The information processing apparatus according to claim 8, wherein when the rating of the AC adaptor is below the predetermined threshold, the circuitry closes the second and third switches and opens the first switch.

10. The information processing apparatus according to claim 9, wherein the circuitry opens the first and second switches and closes the third switch when no AC adaptor is connected.

* * * * *